United States Patent [19]

Traino et al.

[11] 4,400,740
[45] Aug. 23, 1983

[54] INTENSITY CONTROL FOR RASTER OUTPUT SCANNERS

[75] Inventors: James C. Traino, Fairport; Felice A. Micco, Rochester; Douglas L. Keene, New City, all of N.Y.

[73] Assignee: Xerox Corporation, Stamford, Conn.

[21] Appl. No.: 295,438

[22] Filed: Aug. 24, 1981

[51] Int. Cl.³ ............................................. H04N 1/30
[52] U.S. Cl. .................................. 358/293; 332/7.51; 350/358; 358/285; 358/300
[58] Field of Search ...................... 358/285, 293, 300; 350/358; 455/618, 611; 332/751

[56] References Cited

U.S. PATENT DOCUMENTS

| | | | |
|---|---|---|---|
| 3,524,147 | 8/1970 | Soffer et al. | 332/7.51 |
| 3,806,834 | 4/1974 | Johnston et al. | 332/7.51 |
| 3,875,400 | 4/1975 | Pao et al. | 455/611 |
| 3,895,317 | 7/1975 | Burton | 332/7.51 |
| 4,009,385 | 2/1977 | Sell | 332/7.51 |
| 4,070,696 | 1/1978 | Mitchell | 358/293 |
| 4,087,838 | 5/1978 | Masaki | 358/285 |
| 4,122,462 | 10/1978 | Hirayama | 354/5 |
| 4,149,071 | 4/1979 | Nagai | 455/618 |
| 4,205,348 | 5/1980 | De Benedictis | 358/285 |
| 4,270,131 | 5/1981 | Tompkins | 358/285 |
| 4,336,981 | 6/1982 | Mori | 350/358 |

FOREIGN PATENT DOCUMENTS 53-73547 6/1978 Japan .

Primary Examiner—Howard Britton
Attorney, Agent, or Firm—Frederick E. McMullen

[57] ABSTRACT

A control for modulating the scanning beam of a raster output scanner in response to both video image signal levels and beam intensity signal levels through a single port modulator driver with linear balanced amplifier. A control circuit combines the video image signals with an analog beam intensity signal to provide a composite image/intensity control signal which is input to the modulator port to regulate scanning beam intensity. The image intensity signals are derived from a memory previously loaded with data reflecting image beam intensity variations across the scan line, the memory output being updated by a signal representing current beam intensity prior to use by the control circuit.

6 Claims, 3 Drawing Figures

INTENSITY CONTROL FOR RASTER OUTPUT SCANNERS

This invention relates to raster scanners and more particularly to a control for regulating both the video and intensity of the scanning beam.

Raster output scanners (ROS herein) often suffer from inherent writing beam intensity variations which may degrade performance in recording data. This is typically represented by a decrease in raster spot intensity at both ends of scan in conventional overfilled and facet tracking polygon illumination systems. Additionally however, intensity non-uniformities caused by other scanner related components can occur from raster line to raster line or over groups of raster lines, for example, non-uniformities in polygon facet reflectivity, laser power degradation, dirt collection on optical surfaces, loss of modulator efficiency, and the like. In previous applications of laser raster scanning, static adjustment of writing beam intensity was applied to compensate for laser power degradation due to the above. Such static adjustment was implemented by incorporating the laser into a feedback loop and electronically controlling laser excitation current. Stability criteria were met by including in the feedback loop a photosensor which monitored laser power and issued error information to a variable laser power supply. The laser output power was then adjustable, stable, and quiet over the frequency range of D.C. to several kilohertz (kHz).

Later, techniques were devised to reduce raster intensity falloff by dynamically adjusting the spot intensity during scanning. However, dynamic intensity control, as this was known, required more rapid correction of the raster spot intensity than was possible with the previous static adjustment techniques and this speed requirement, coupled with advances in laser technology, which reduced the need to externally compensate for laser instability and noise, led to performing intensity control with an acoustic type optical modulator having a specially modified radio frequency (r.f.) driver with two ports in place of the conventional one port driver of acoustic optic modulators. This dual port driver accepted image data through one port (i.e. the digital signal) and intensity correction data through a second port (the analog signal). Thus it was possible to correct raster output scanner intensity variations only by using a specially modified acousto optic modulator r.f. driver.

However, the foregoing technique of correcting laser beam intensity requires that the r.f. driver for the acousto-optic modulator be specially modified and does not accommodate or permit use of un-modified single port type r.f. drivers found with acousto optic modulators. The present invention is intended to overcome this difficulty by enabling both laser beam intensity and video image signal control, but with conventional single port r.f. drivers.

This invention relates to a raster output scanner, comprising in combination, a high intensity beam of electromagnetic radiation; means to scan the beam across a photoreceptor to expose the photoreceptor and create latent electrostatic images thereon in response to image signals; modulator means to modulate the beam in response to control signals, the modulator means having a single port for receiving the control signals; a source of video image signals; a source of beam intensity signals; and means to combine the video image signals with the beam intensity signals to provide the control signals for input to the modulator means port whereby the modulator means modulates both on and off of the beam and beam intensity in accordance with both the video image signals and beam intensity signals.

IN THE DRAWINGS

Figure 1:
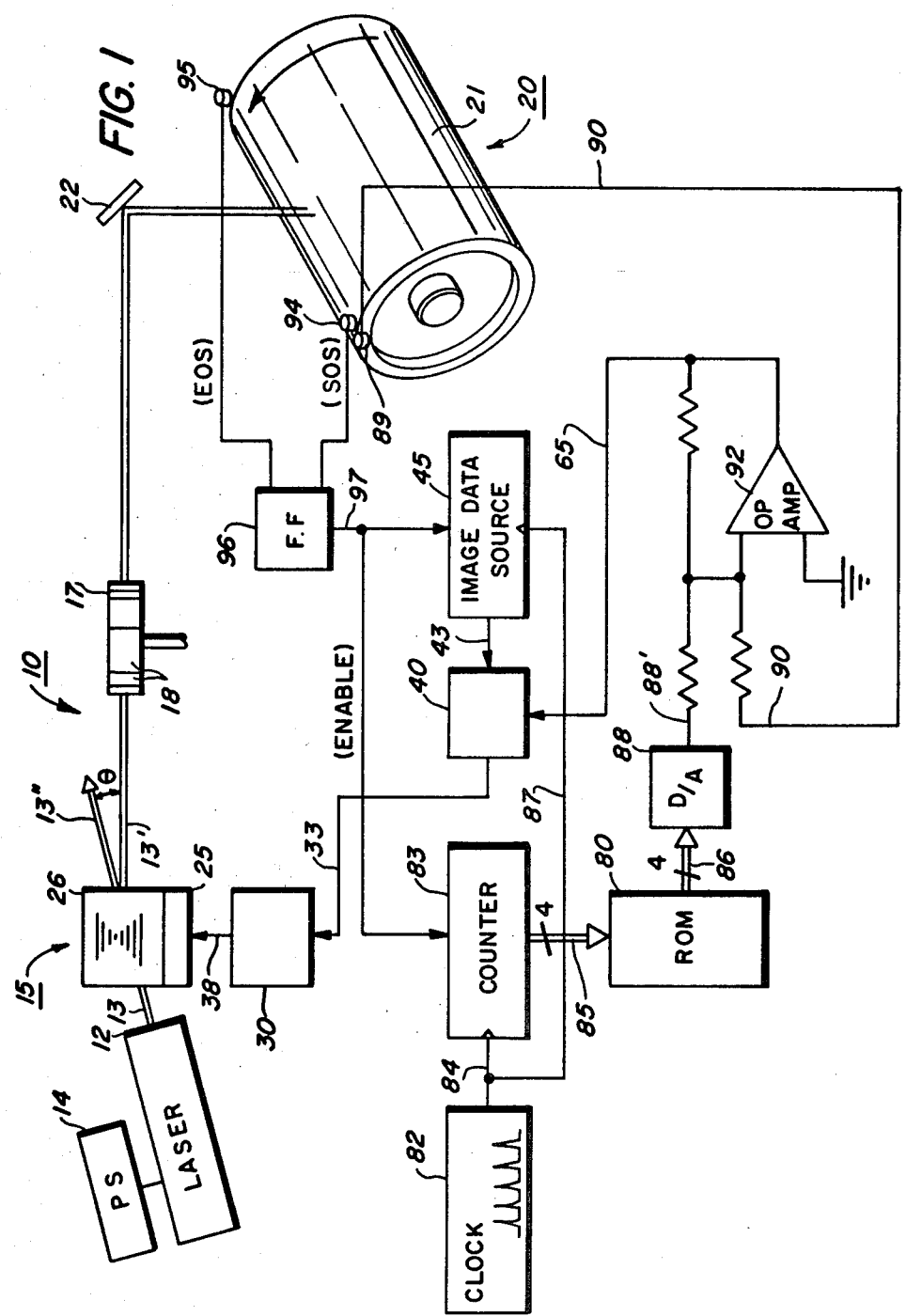
FIG. 1 is a schematic view of an exemplary raster output scanner incorporating the control of the present invention for modulating both the scanning beam on/off and beam intensity through a single port modulator.

Referring to FIG. 1 of the drawings, an exemplary raster scanner 10 is thereshown. Scanner 10 includes a suitable source of high intensity light such as a laser 12. Power supply 14 provides operating power to laser 12. The beam 13 of light output by laser 12 is passed to an acousto optic modulator 15 which modulates both the video, i.e. the on/off, and intensity of beam 13 as will appear. From modulator 15 the now modulated beam 13' is passed to a scanning element, herein illustrated in the form of a rotating polygon 17. Polygon 17 sweeps the modulated beam impinging on the facets 18 thereof across the photosensitive surface 21 of a moving recording member, shown here in the form of a xerographic drum 20 of a conventional xerographic system (not shown). Suitable optical elements such as mirror 22 may be interposed in the beam optical path to guide and/or focus the beam onto the surface 21 of the drum 20 and provide the requisite beam dimension.

As used herein, the term "light" refers to an electromagnetic radiation in the visible, ultraviolet, and infrared portions of the electromagnetic system.

Acousto optic modulator 15, which is of conventional design and construction, comprises an electrically driven piezo electric transducer 25 acoustically coupled to an acousto-optical crystal 26. Transducer 25 generates an acoustic wave in response to an electrical signal which travels through the crystal 26 perturbing the index of refraction and acting as a phase grating, the grating period being equal to the drive or acoustic frequency with grating density being proportional to the amplitude of the drive signal applied thereto.

As will be understood by those skilled in the art, without a signal applied to transducer 25, only the non-defracted beam 13" exists. Application of a predetermined signal level to transducer 25 defracts the beam 13 at an angle $\theta$ to produce a defracted light beam 13'. In addition, by varying the acoustic power applied, modulator 15 acts to modulate the intensity of the defracted light beam 13' as will appear.

Figure 2:
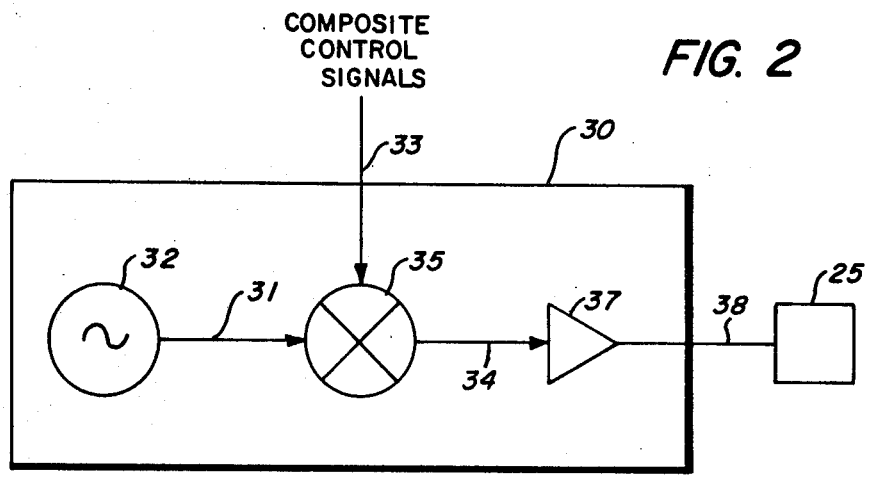
FIG. 2 is a view showing details of the single port r.f. driver for the modulator shown in FIG. 1.

To drive modulator 15, a single port r.f. driver 30 is provided. Referring to FIG. 2, driver 30 includes a fixed frequency signal source, shown herein as oscillator 32. Oscillator 32 outputs a signal of constant amplitude and constant frequency through line 31 to a linear balanced mixer 35. There, the r.f. signal is mixed with a composite video image and beam intensity control signal input to linear balanced mixer 35 through line 33. The output signal of mixer 35 to line 34 is amplified by amplifier 37 and output through line 38 to transducer 25 of modulator 15. As will be understood, linear balanced mixer 35 is an analog device which enables continuous control over the r.f. signal output of oscillator 32 to the modulator 15 to be continuously controlled. By controlling the r.f. signal output to modulator 15, the transmission efficiency of acousto optic modulator 15 can in turn be controlled. Control over the r.f. driver is accomplished by combining the digital video image signal with an analog beam intensity control signal to provide a composite control signal which effects not only on/off switching of the writing beam 13' but also control of the beam intensity.

Figure 3:
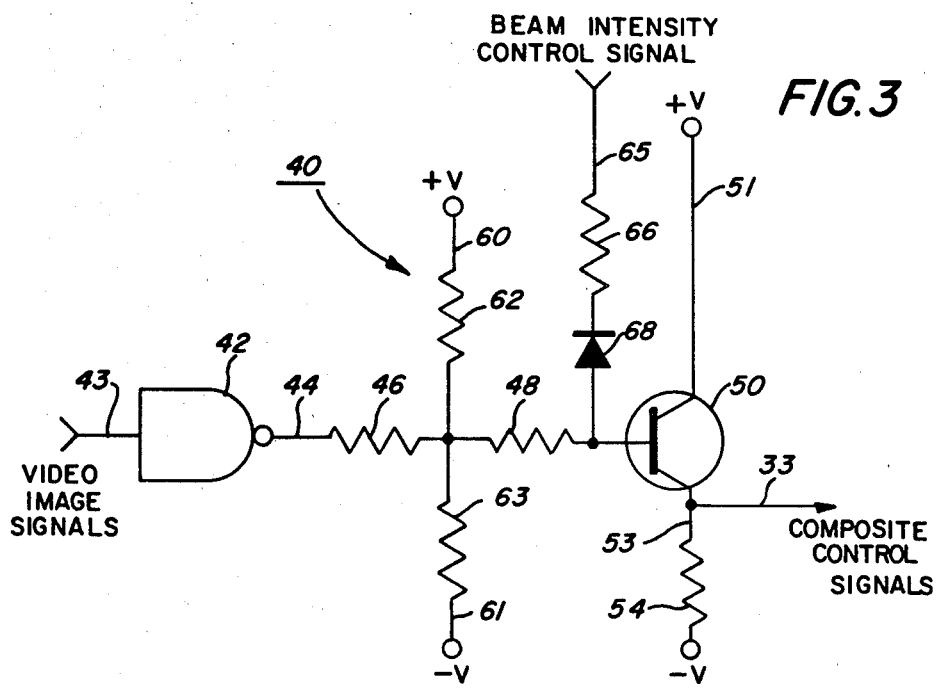
FIG. 3 is a circuit diagram showing details of the control circuit portion of the control shown in FIG. 1.

Referring particularly to FIG. 3, the composite control signal output in line 33 to r.f. driver 30 is derived by control circuit 40. Circuit 40 includes an input gate 42 to which the digital video image signals are input through lead 43. As will be understood by those skilled in the art, the image signals may be derived from any suitable source 45. Image signal source 45 may for example comprise a memory, communication channel, raster input scanner, and the like. The output side of gate 42 is coupled through line 44 and resistors 46, 48 to the base of control transistor 50. Line 51 couples the collector of transistor 50 to a suitable positive reference voltage V. Output line 33 is connected to the emitter of transistor 50. Line 33 is tapped by line 53, line 53 being coupled through resistor 54 to a suitable negative reference voltage V. Positive and negative reference voltages V are coupled through lines 60, 61 and resistors 62, 63 respectively to line 44, lines 60, 61 being tapped into line 44 at a point between resistors 46 and 48. A beam intensity control signal, which as will appear may be derived from memory, is input through line 65, line 65 being coupled through resistor 66 and diode 68 to line 44 between resistor 48 and transistor 50.

In one embodiment, positive and negative reference potentials +V, −V respectively, are + and −5 volts D.C. Other component parts of circuit 40 are identified as follows:

| | |
|---|---|
| Resistor 46 | 39 ohms |
| Resistor 48 | 47 ohms |
| Resistor 62 | 160 ohms |
| Resistor 63 | 390 ohms |
| Resistor 66 | 10 ohms |
| Resistor 54 | 220 ohms |
| Gate 42 | Texas Instrument (T.I.) 74S20 |
| Transistor 50 | Texas Instrument (T.I.) 2N3866 |
| Diode 68 | Motorola MBD 101 |

In operation the video image signals input to circuit 40 in line 43 serve to switch transistor 50 between two operating points within the transistor's linear region. The lower point, which is set by the bias conditions of transistor 50, fixes the beam off intensity level for beam 13. The upper point, which is determined by the magnitude of the beam intensity control signal in line 65, fixes the beam on intensity. When the base drive voltage of control transistor 50 exceeds the beam intensity control signal level plus the set voltage of diode 68, diode 68 enters a forward conduction mode to shunt the excess base voltage of transistor 50 to an ideal voltage source, represented by the beam intensity control signal in line 65. The beam intensity control signal accordingly limits the maximum base drive level of transistor 50 to set the maximum transistor emitter voltage thereby providing a composite control signal to r.f. driver 30.

The beam intensity control signal may be derived from any suitable circuit or digital technique.

Referring to FIG. 1, in a preferred embodiment, the beam intensity control signal is derived from beam intensity data stored in a suitable memory such as ROM 80. Intensity data stored in ROM 80 is suitably obtained, as for example, by running a calibration sequence on scanner 10 before use. Calibration may be carried out by scanning beam 13' across the surface 21 of drum 20 while measuring beam intensity at various selected points along the beam scan line. The beam intensity measurements, which are normally analog signals, are converted to digital signals by a suitable analog-to-digital converter (not shown) and stored in ROM 80 pending use. Typically, as will be understood by those skilled in the art, the intensity of the beam 13 is normally at a maximum adjacent the center of the scan line with intensity fall-off at both ends of the scan line.

A suitable pixel clock 82 is provided for generating pixel clock signals for clocking the video image signals, clock signals from clock 82 being input to image data source 45 through clock lead 87. To correlate input of video image signals from image data source 45 with scanning of beam 13' across the photosensitive surface 21, suitable start of scan (SOS) and end of scan (EOS) detectors 94, 95 are provided in the path of scanning beam 13' to detect when beam 13' enters and leaves the operating margins of the photosensitive surface 21. The signal outputs of SOS and EOS detectors 94, 95 respectively are fed to a suitable video control flip flop 96. The output of flip flop 96 to line 97 controls enablement of image data source 45 such that video image signals are output to circuit 40 during the period when scanning beam 13' is within the operating margins of photosensitive surface 21.

An address counter 83 is provided to progressively address ROM 80, bus 85 coupling counter to ROM 80. Pixel clock 82, which is coupled to address counter 83 by clock line 84, serves to clock counter 83 in synchronism with the clocking of video image signals from image data source 45. The signal output of control flip flop 96 serves to control enabling of address counter 83 to correlate output of beam intensity data stored in ROM 80 with input of video image signals from image data source 45 on a line by line basis.

The output of ROM 80 is coupled by bus 86 to a D/A converter 88 which converts the digital signal output of ROM 80 to an analog signal. The signal output by D/A converter 88 is fed to op amp 92 through line 88'. The output of op amp 92 which may comprise a Texas Instruments Model T.I. 747 op amp, is coupled by line 65 to control circuit 40. To accommodate changes in beam intensity after calibration and during operation of scanner 10, a suitable light intensity detector 89 is disposed in the path of beam 13 to measure beam intensity. The signal output by detector 89 is fed through line 90 to op amp 92 where the signal is used to update the corrective signal output by ROM 80. The output of op amp 92 comprises the beam intensity control signal input to control circuit 40.

While the invention has been described with reference to the structure disclosed, it is not confined to the details set forth but is intended to cover such modifications or changes as may come within the scope of the following claims.

We claim:

1. In a raster output scanner, the combination of:
a high intensity beam of electromagnetic radiation;
means to scan said beam across a photoreceptor to expose said photoreceptor and create latent electrostatic images thereon;
modulator means for modulating said beam in response to control signals, said modulator means having a single port for receiving said control signals;
a source of video image signals;
a source of beam intensity signals; and
means for combining said video image signals with said beam intensity signals to provide said control signals for input to said modulator means port whereby said modulator means beams and modulates both on and off of said beam intensity in accordance with said video image signals and said beam intensity signals, said source of beam intensity signals including
means providing a first corrective signal reflecting changes in intensity of said beam as said beam scans across said photoreceptor;
means providing a second corrective signal reflecting current beam intensity as said beam scans across said photoreceptor;
and means for combining said first and second corrective signals to provide said beam intensity signals.

2. The raster output scanner according to claim 1 in which said signal combining means includes a video line for said video image signals, first switch means for varying the signal level of said video image signals in said video line in response to said intensity signals, and
second switch means for controlling input of said control signals to said modulator means,
said video line being coupled to the control gate of said second switch means to control output and intensity of said control signals to said modulator means.

3. The raster output scanner according to claim 1 in which said source of beam intensity signals includes
a memory for storing data relating to the intensity of said beam at selected points as said beam scans across said photoreceptor;
digital to analog converter means for converting beam density data from said memory to analog signals;
means for addressing said memory in synchronism with scanning of said beam across said photoreceptor to provide said data;
means for measuring instantaneous beam intensity each time said beam scans across said photoreceptor;
and means for combining said analog signal with said instantaneous beam intensity signal to provide said beam intensity signals.

4. The raster output scanner according to claim 1 in which said modulator means includes a beam modulating element and a modulator driver, said driver including a signal mixer and oscillator means for supplying r.f. signals to said mixer, said control signals being input to a control gate of said mixer to vary the amplitude of said r.f. signals in accordance with said control signals to provide modulating signals to said beam modulating element.

5. In a raster scanner for exposing an imaging member with a high intensity beam of light modulated in accordance with video image signals to create an image represented by said image signals, the combination of:
(a) a single port modulator for modulating said beam in accordance with a control signal input;
(b) a source of beam correction signals for varying the intensity of said beam to provide substantially uniform beam intensity as said beam scans said imaging member;
(c) a source of video image signals;
(d) clock means for generating clock signals for clocking said video image signals to said scanner; and
(e) means for combining said beam correction signals and said video image signals to provide said control signal, said combining means including means to clock said correction signals with said clock signals whereby to synchronize said beam correction signals with said video image signals, said source of beam correction signals including
(1) memory means for storing first beam corrective signals;
(2) means for measuring current beam intensity to provide second beam corrective signals, and
(3) means for merging said first beam corrective signals with said second beam corrective signals to provide said beam correction signals.

6. The method of accommodating variations in the intensity of a scanning beam modulated in accordance with video image signals as said beam scans across a photoreceptor member, the steps comprising:
(a) providing first beam intensity signals from memory;
(b) monitoring said beam as said beam scans across said photoreceptor to provide second beam intensity signals representing the current intensity of said beam;
(c) combining said first and second beam intensity signals to provide composite beam intensity signals;
(d) combining said composite beam intensity signals with said video image signals to provide a single control signal for modulating said beam; and
(e) modulating said beam in accordance with said control signal.

* * * * *